United States Patent
Ma et al.

(10) Patent No.: US 6,285,434 B1
(45) Date of Patent: Sep. 4, 2001

(54) SUBSTRATE FOR COLORED CHOLESTERIC LIQUID CRYSTAL DISPLAY ALLOWING CHOLESTERIC LIQUID CRYSTAL MATERIAL TO BE FILLED BY SURFACE TENSION WITHOUT VACUUM

(75) Inventors: Yao Dong Ma, Richardson; Bao-Gang Wu, Amarillo; Jianmi Gao, Amarillo; Jianan Hou, Amarillo; Yong-Jing Wang, Canyon; Qihui J. Zhang, Amarillo, all of TX (US)

(73) Assignee: Advanced Display Systems, Inc., Amarillo, TX (US)

( * ) Notice: Subject to any disclaimer, the term of this patent is extended or adjusted under 35 U.S.C. 154(b) by 0 days.

(21) Appl. No.: 09/026,631

(22) Filed: Feb. 20, 1998

(51) Int. Cl.[7] .................. G02F 1/1341; G02F 1/133; G02F 1/1339; C09K 19/02
(52) U.S. Cl. .................. 349/189; 349/73; 349/153; 349/176
(58) Field of Search .................. 349/73, 189, 153, 349/154, 175, 176

(56) References Cited

U.S. PATENT DOCUMENTS

| | | | |
|---|---|---|---|
| 3,909,930 | * 10/1975 | Gurtler | 29/592 |
| 4,099,550 | * 7/1978 | Matsuzaki et al. | 141/51 |
| 4,389,095 | 6/1983 | Oh et al. | 350/334 |
| 4,451,122 | 5/1984 | Teshima | 350/334 |
| 4,691,995 | * 9/1987 | Yamazaki et al. | 350/331 R |
| 5,361,152 | * 11/1994 | Harada et al. | 359/80 |
| 5,725,032 | * 3/1998 | Oshima et al. | 141/70 |
| 5,895,107 | * 4/1999 | Haslam | 349/172 |
| 6,094,251 | * 7/2000 | Jones et al. | 349/172 |

FOREIGN PATENT DOCUMENTS

| | | | |
|---|---|---|---|
| 55059431 | 2/1980 | (JP) | G02F/1/133 |
| 59121315 | 7/1984 | (JP) | G02F/1/133 |
| 62003224 | 1/1987 | (JP) | G02F/1/133 |
| 09251165A | 9/1997 | (JP) | G02F/1/341 |

\* cited by examiner

*Primary Examiner*—William L. Sikes
*Assistant Examiner*—Tarifur R. Chowdhury
(74) *Attorney, Agent, or Firm*—Jackson Walker, L.L.P.

(57) ABSTRACT

A substrate for a multi-color liquid crystal display (LCD), an LCD having the substrate, and methods of manufacturing the substrate and the LCD. In one embodiment, the substrate includes: (1) a substantially planar base and (2) a cell wall structure, located on a surface of the base, that defines at least first and second sets of independent cells having corresponding independent fluid fill ports when the cell wall structure is bonded to an opposing substrate.

28 Claims, 7 Drawing Sheets

SUBSTRATE FOR COLORED CHOLESTERIC LIQUID CRYSTAL DISPLAY ALLOWING CHOLESTERIC LIQUID CRYSTAL MATERIAL TO BE FILLED BY SURFACE TENSION WITHOUT VACUUM

TECHNICAL FIELD OF THE INVENTION

The present invention is directed, in general, to liquid crystal displays ("LCD"s) and, more specifically, to a cell wall structure for an LCD that allows for a multi-color, or multi-liquid crystal, display and a method of manufacture of the cell wall structure.

BACKGROUND OF THE INVENTION

The development of improved liquid crystal ("LC") flat-panel displays is an area of very active research, driven in large part by the proliferation of and demand for portable electronic appliances, including computers and wireless telecommunications devices. Moreover, as the quality of LC displays improves, and the cost of manufacturing declines, it is projected that LC displays ("LCD"s) may eventually displace conventional display technologies, such as cathode-ray-tubes.

One aspect of LCDs, to which significant research has been directed in recent years, is the demand for such displays to provide full-color images. It is quite possible that LCDs capable of displaying full-color images, at full-motion video rates, will eventually displace conventional cathode-ray tubes in television and computer display applications. Several characteristics of conventional LCD materials and methods of manufacturing such displays, however, present barriers to an efficient method of manufacturing full-color displays.

LCDs are constructed by trapping a thin film of LC between two substrates of glass or transparent plastic. The conventional method of trapping the LC between the substrates is to first join the substrates and then introduce a LC into the interstitial region(s) formed therebetween. The substrates are usually manufactured with transparent electrodes, typically made of indium tin oxide ("ITO"), to which electrical "driving" signals are coupled. The driving signals induce an electric field which can cause a phase, or state, change in the LC material; the LC exhibits different electro-optical characteristics according to its phase and/or state.

One practical difficulty of manufacturing full-color displays, using conventional techniques, is controlling the wavelength maxima for each individual microscopic pixel (or sub-pixel). Conventional manufacturing techniques introduce a LC and a predetermined amount of twist agent, as a homogenous solution, into the region between the display substrates, which results in a LCD capable of displaying only one color, or black and white, that is dependent on the relative ratio of twist agent to LC, and/or the arrangement of polarizers. To realize a full-color display, a color filter having, for example, red, green and blue ("RGB") regions (corresponding to individual sub-pixels) can be mated to the LCD; the use of a color filter, however, reduces the overall brightness, and contrast ratio, of the display.

Therefore, what is needed in the art is a LCD, and one or more methods of manufacture thereof, that is optimized for mass production and adaptable to allow multi-color LCDs to be produced without the need for a separate color filter.

SUMMARY OF THE INVENTION

To address the above-discussed deficiencies of the prior art, it is a primary object of the present invention to improve the manufacturability of multi-color liquid crystal displays ("LCD"s).

In the attainment of the above-described primary object, the present invention provides a substrate for a multi-color liquid crystal display (LCD), an LCD having the substrate, and methods of manufacturing the substrate and the LCD. In one embodiment, the substrate includes: (1) a substantially planar base and (2) a cell wall structure, located on a surface of the base, that defines at least first and second sets of independent cells having corresponding independent fluid fill ports when the cell wall structure is bonded to an opposing substrate.

The present invention therefore introduces a substrate having a cell wall structure that enhances manufacturability by isolating the fluid fill ports corresponding to each set of independent cells, whereby each set of independent cells can be selectively-filled with a liquid crystal having desired properties. By isolating the fluid fill ports, the likelihood that liquid crystal fill fluids for the sets of independent cells can be inadvertently mixed during manufacture is reduced substantially.

In one embodiment of the present invention, fluid fill ports corresponding to a first set of independent cells are on an opposite end of the substrate from fluid fill ports corresponding to a second set of independent cells. In an alternate embodiment, the fluid fill ports are all located along a common edge of the substrate, but are selectively sealed or unsealed to allow each set of independent cells to be filled separately from the other set(s) of independent cells.

In one embodiment of the present invention, the cell wall structure comprises recesses that form at least first and second sets of independent cells bounded by said cell wall structure and the first and second substrates, the first and second sets of independent cells having corresponding independent fluid fill ports adapted to be opened and filled independently; in an embodiment to be illustrated and described, three sets of independent cells are provided.

The sets of independent cells may be filled with LC fill fluids having different intrinsic wavelengths to yield a multi-color, or full-color, LCD; for example, LC fill fluids having intrinsic wavelengths corresponding to the colors red, green and blue may be independently introduced into the three sets of independent cells. As used herein, "intrinsic color" means the liquid crystal molecules have the characteristic of reflecting a certain wave band of incoming light with a center wavelength of $\lambda=np$, where n is the average refractive index of the liquid crystal. The color tint depends on the relative concentration of the twisting, or chiral, liquid crystal material, which determines the pitch of the liquid crystal. "Extrinsic color," as used herein, means that the liquid crystal itself cannot generate color, but an extrinsic material can be doped into the nematic liquid crystal solution as an additive, such as a dichroic dye or dichroic dye polymer mixture, or dichroic polymer dispersed liquid crystal (PDLC); the color tint depends on the different dye molecules. A full color display can also be achieved by filling different extrinsic colors into different columns of the liquid crystal cells.

In one embodiment of the present invention, the independent cells are parallel to one another. In a related embodiment, the independent cells form columns of the LCD; alternatively, the independent cells may form rows of the LCD or other desirable configurations.

In one embodiment of the present invention, the substrate further comprises an opposing substrate mated to the cell wall structure, the fluid fill ports adapted to receive a seal to selectively trap liquid crystal fill fluids within the independent cells. In an embodiment to be illustrated and described, seals are formed after an appropriate LC fill fluid is introduced into the independent cells. In alternate embodiments, seals may be broken to allow a set of independent cells to be filled with an LC fill fluid; subsequent to filling, the set of independent cells may be resealed.

In one embodiment of the present invention, an LCD employing the substrate comprises fill fluids having different intrinsic, or extrinsic, wavelengths, located in different sets of independent cells, to form a multicolor LCD.

In one embodiment of the present invention, the cell wall structure consists of a single serpentine wall; the cell wall structure may alternatively be formed of multiple independent and/or interleaved walls.

In one embodiment of the present invention, the cells are sufficiently narrow to be filled by means of capillary action; a vacuum may be employed to enhance capillary action. Those skilled in the art are familiar with various conventional techniques for introducing fill fluid into the cells of an LCD.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
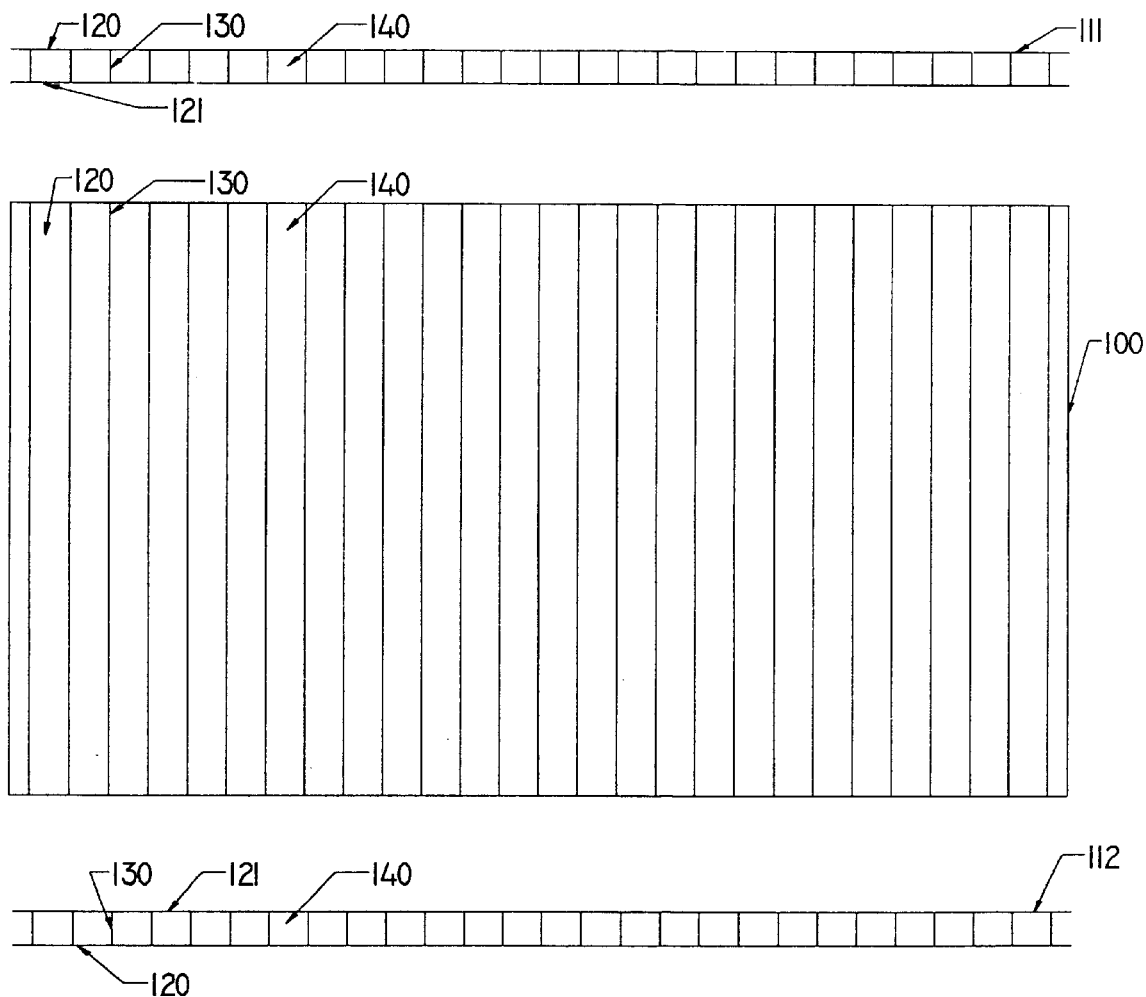
FIG. 1 illustrates frontal and edge views of a prior art substrate having a cell wall structure that defines a plurality of non-independent cells.

Referring initially to FIG. 1, illustrated are a frontal view 110 and edge views 111, 112 of a prior art substrate 100 having a cell wall structure that defines a plurality of non-independent cells; those skilled in the art will recognize that the scale of the illustrations provided herein is much larger than the typical dimensions of practical liquid crystal displays. As shown in the frontal view 110, the substrate 100 has a substantially planar base 120 having a plurality of spacing elements, or cell walls, generally designated 130, distributed on the surface of the base 120. The cell walls 130 are substantially parallel to each other and extend above the surface of the base 130 to a height equal to a preferred cell gap when mated to a second substrate 121, as shown in edge views 111, 112. The spacing between adjacent cell walls 130 is a function of a desired size of a picture element, or "pixel."

As shown in the edge views 111 and 112, when the substrate 100 is mated to a second substrate 121, the cell walls 130 define a plurality of "non-independent" cells, generally designated 140. As used herein, "non-independent" refers to the fact that the cells, or sets of cells, cannot be independently filled with different liquid crystal ("LC") materials, due to the generally very close spacing, e.g., 20 $\mu$m, between adjacent cells. The inability to fill the cells 140 with different liquid crystal materials means that other techniques must be employed to selectively alter the color characteristic of the liquid crystal material in each cell subsequent to filling, or a separate color filter must be used. For example, U.S. Pat. No. 5,268,782 discloses a method of providing for different color liquid crystals in each cell 140, but the method requires post-filling processing techniques. It is an object of the present invention to provide a substrate structure that allows cells to be selectively-filled with liquid crystal materials having predetermined color characteristics, whereby a LCD display capable of displaying two or more colors may be fabricated without the need for post-filling processing techniques or the need for a separate color filter.

Those skilled in the art are familiar with various techniques for manufacturing the prior art substrate 100, having a plurality of cell walls 130 on a base 120. For example, cell walls may be formed using photoresist material bonded to a planar base, as disclosed in U.S. Pat. No. 4,720,173, incorporated herein by reference. Alternatively, U.S. Pat. No. 5,268,782, also incorporated herein by reference, discloses a micro-ridged, polymeric LCD substrate having cell walls, or "spacing elements," physically and chemically integral with a substrate. The principles of the present invention are not limited to any particular method of forming the cell walls on a substrate; the scope of the claims recited hereinafter is intended to cover the novel cell wall structures described hereinafter, without regard to how such structures are fabricated on a substrate.

Figure 2:
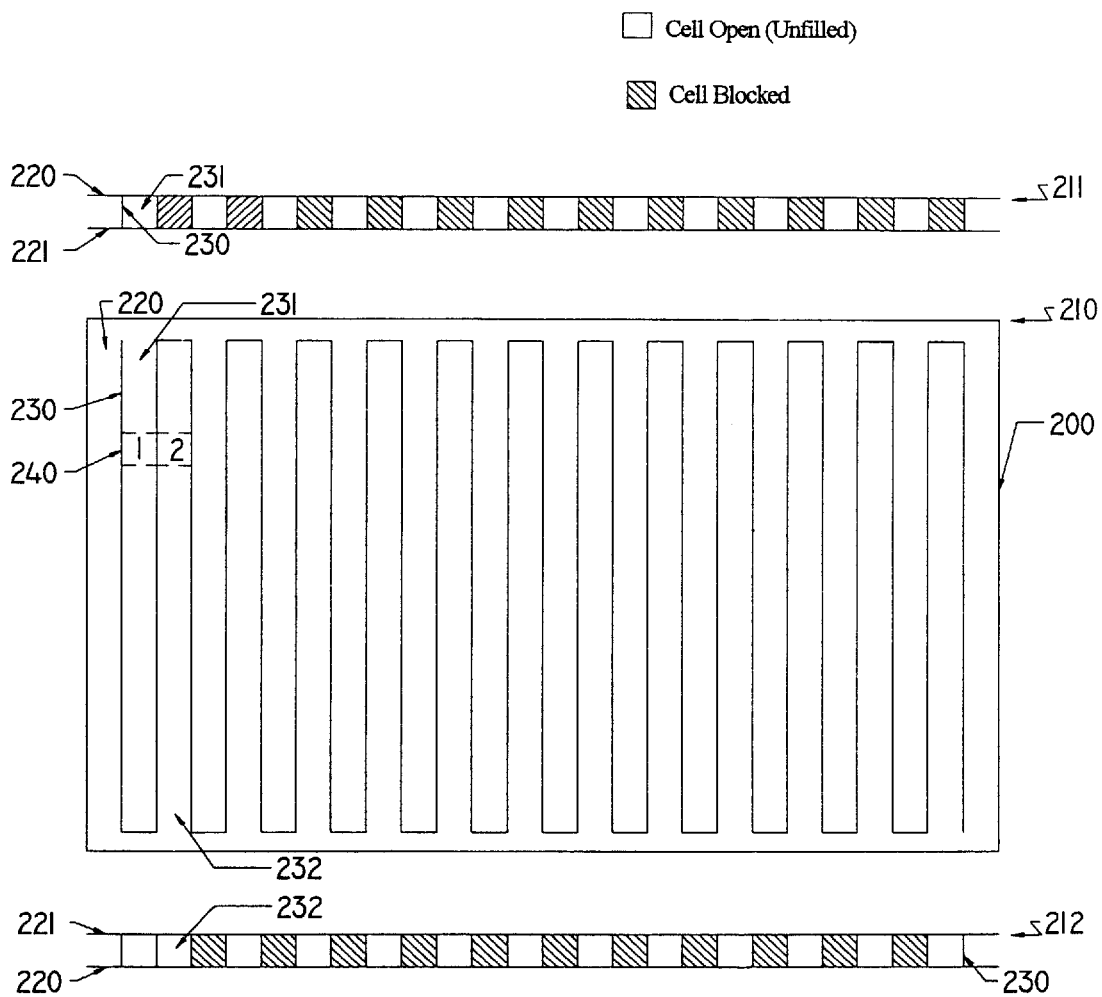
FIG. 2 illustrates frontal and edge views of an exemplary substrate having a cell wall structure that defines two sets of independent cells, according to the principles of the present invention.

Turning now to FIG. 2, illustrated are a frontal view 210 and edge views 211, 212 of an exemplary substrate 200 having a cell wall structure that defines two sets of independent cells. As shown in the frontal view 210, the substrate 200 has a substantially planar base 220 having a cell wall structure 230 distributed on the surface of the base 220. The cell wall structure 230 consists of a single serpentine wall that defines first and second sets of independent cells, generally designated 231 and 232, having corresponding independent fluid fill ports located at opposite edges of the substrate 200 when bonded to an opposing substrate 221, as shown in edge views 211, 212. The cell wall structure 230 extends above the surface of the base 220 to a height equal to a preferred cell gap when mated to the second substrate 221, as shown in edge views 211, 212; the spacing between adjacent cell walls is a function of a desired size of a picture element, or "pixel."

As shown in the edge views 211 and 212, when the substrate 200 is mated to a second substrate 221, the cell wall structure 230 defines two sets of "independent" cells. As used herein, "independent" refers to the fact that each set of cells 231 and 232 can be filled independently with different liquid crystal ("LC") materials. For example, the set of independent cells 231 can be filled with a first liquid crystal material using a conventional vacuum-filling method, and then sealed using, for example, an epoxy. The set of independent cells 232 can then be filled with a second liquid crystal material, again using a conventional vacuum-filling method, and then sealed. Alternatively, if the substrates 220 and 221 are flexible, both sets of independent cells 231 and 232 may be filled simultaneously by placing the bonded substrates in a vacuum, flexing the substrates such that the fluid fill ports on either end are immersed in separate reservoirs of different liquid crystal materials, and then removing the vacuum to simultaneously draw liquid crystal material by capillary action into both sets of independent cells.

In one embodiment, the first and second liquid crystal fill fluids introduced into the sets of independent cells 231 and 232, respectively, have first and second intrinsic wavelengths, respectively, and a pixel 240 (one shown) is comprised of adjacent portions, or "sub-pixels," of two independent cells, whereby the resulting liquid crystal display is capable of displaying a multicolor image; those skilled in the art are familiar with the capability of displaying multi-color images by combining sub-pixels of different colors to provide a pixel capable of displaying a range of colors that is a function of the color and relative intensities of each sub-pixel. The location of each sub-pixel can be defined by the location of transparent electrodes (not shown) located on each substrate.

Those skilled in the art are familiar with the use of transparent electrodes, such as indium tin oxide ("ITO"), with liquid crystal displays. Depending on the method used to fabricate the cell wall structure 230, the transparent electrodes may be applied to the substrate 200 either before or after the formation of the cell wall structure. For example, photoresist and/or vapor deposition techniques may be employed; the principles of the present invention, however, are not restricted to a particular method of forming the transparent electrodes on the substrates. In one embodiment, the transparent electrodes are arranged such that each column of pixels of the liquid crystal display is formed from adjacent ones of the independent cells 231 and 232. Alternatively, adjacent ones of the independent cells 231 and 232 may form a row of pixels. Those skilled in the art will conceive of various alternative pixel architectures; the principles of the present invention are not limited to a particular pixel, or sub-pixel, format, all such formats being within the scope of the claims recited hereinafter.

Figure 3:
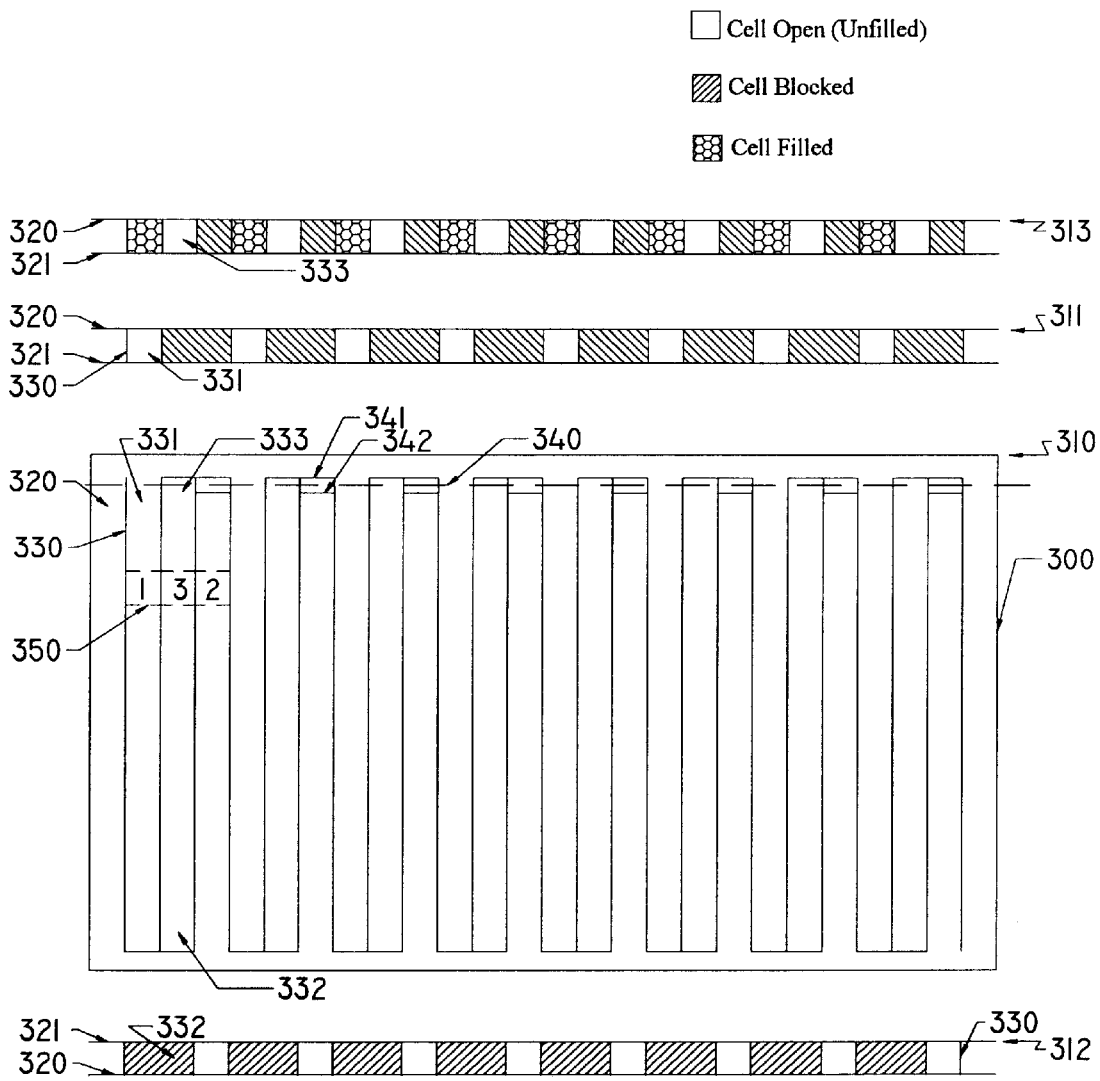
FIG. 3 illustrates frontal and edge views of a first exemplary substrate having a cell wall structure that defines three sets of independent cells, according to the principles of the present invention.
Figure 4:
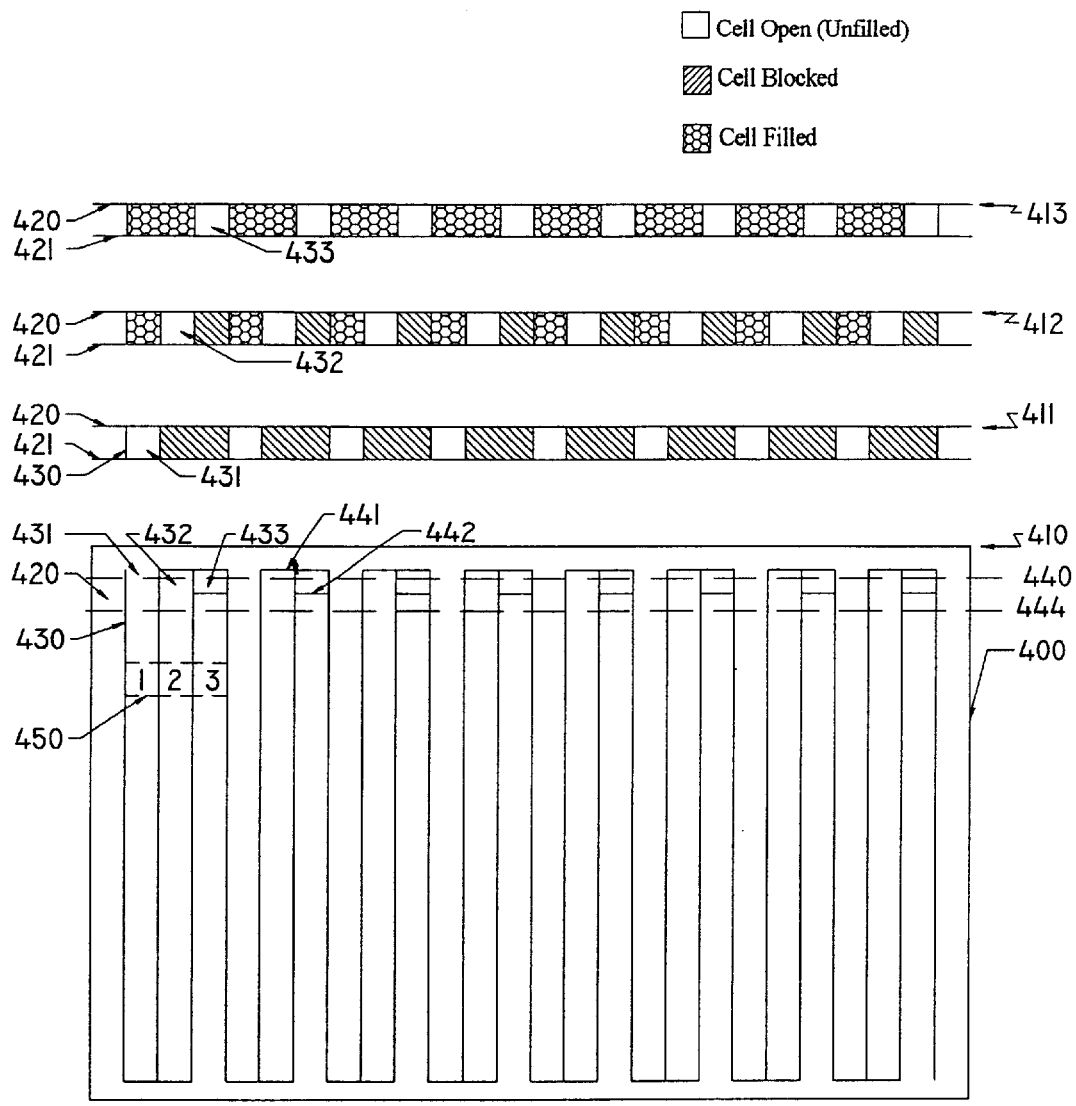
FIG. 4 illustrates frontal and edge views of a second exemplary substrate having a cell wall structure that defines three sets of independent cells, according to the principles of the present invention.
Figure 5:
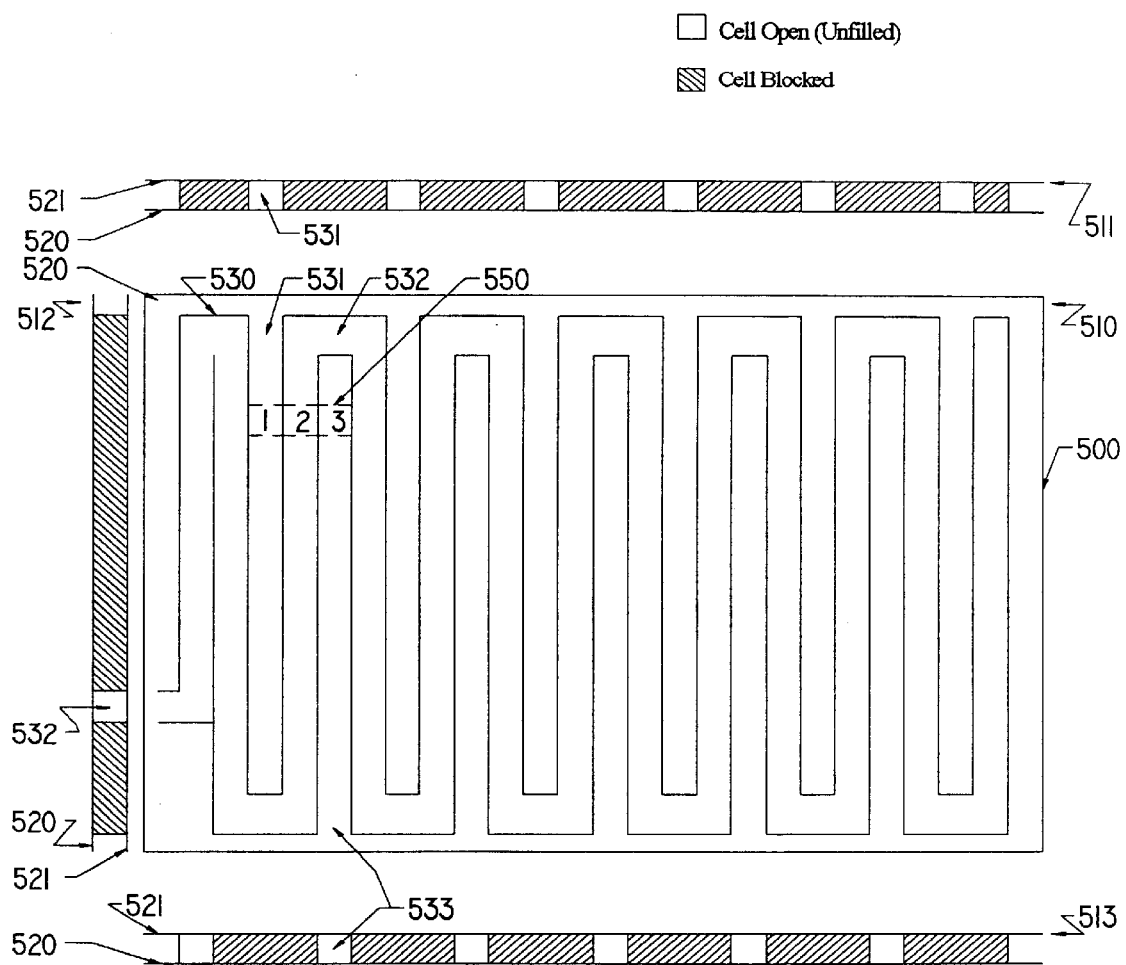
FIG. 5 illustrates frontal and edge views of a third exemplary substrate having a cell wall structure that defines three sets of independent cells, according to the principles of the present invention.

From the foregoing, those skilled in the art will recognize that the present invention introduces the novel capability to independently fill sets of independent cells 231 and 232 with different liquid crystal materials. Thus, a liquid crystal display capable of displaying two or more colors, or colors that combine to appear substantially white, may be fabricated without the need for post-filling processing to selectively alter the color characteristic of the liquid crystal material in each cell subsequent to filling, or the use of a separate color filter. The principles of the present invention are not limited to a specific cell wall structure such as that illustrated in FIG. 2; FIGS. 3–5, described hereinafter, disclose other exemplary substrates having various cell wall structures that define two or more sets of independent cells. Those skilled in the art will conceive of still other cell wall structures based on this principles disclosed herein; all such cell wall structures are intended to be within the scope of the claims recited hereinafter.

Turning now to FIG. 3, illustrated are a frontal view 310 and edge views 311, 312, 313 of a first exemplary substrate 300 having a cell wall structure that defines three sets of independent cells 331, 332, and 333. As shown in the frontal view 310, the substrate 300 has a substantially planar base 320 having a cell wall structure 330 distributed on the surface of the base 320. The cell wall structure 330 defines first, second, and third sets of independent cells, generally designated 331, 332, and 333. The fluid fill ports for the first and second sets of independent cells 331, 332 are located at opposite edges of the substrate 300 when bonded to an opposing substrate 321, as shown in edge views 311 and 312, respectively. Portions of the cell wall structure 330 are initially used to block the fluid fill ports for the third set of independent cells 333, which are located along the same edge as the fluid fill ports for the first set of independent cells 331, as shown in edge view 313; the purpose of blocking the fluid fill ports will be described hereinafter.

As with the other embodiments described herein, the cell wall structure 330 extends above the surface of the base 320 to a height equal to a preferred cell gap when mated to the second substrate 321, as shown in edge views 311, 312, and 313; the spacing between adjacent cell walls is a function of a desired size of a picture element, or "pixel."

As shown in the edge views 311, 312 and 313, when the substrate 300 is mated to a second substrate 321, the cell wall structure 330 defines three sets of independent cells 331, 332, and 333. In one embodiment, the set of independent cells 331 can be filled with a first liquid crystal material using a conventional vacuum-filling method and then sealed using, for example, an epoxy. The set of independent cells 332 can then be filled with a second liquid crystal material, again using a conventional vacuum-filling method, and then sealed. Alternatively, if the substrates 320 and 321 are flexible, both sets of independent cells 331 and 332 may be filled simultaneously by placing the bonded substrates in a vacuum, flexing the substrates such that the fluid fill ports on either end are immersed in separate reservoirs of different liquid crystal materials, and then removing the vacuum to simultaneously draw liquid crystal material by capillary action into both sets of independent cells 331, 332.

Subsequent to filling the first set of independent cells 331, the edge of the substrate 320 can be trimmed along a line 340, between the portions of the cell wall structure 330 generally designated as 341 and 342, in order to open the set of independent cells 333 for filling with liquid crystal. The portion 342 of the cell wall structure 330 is preferably used to block the liquid crystal material used to fill the third set of independent cells 333 from entering the second set of independent cells 332. For example, the second set of independent cells 332 may be filled using a vacuum-filling method; e.g., vacuum degas the substrate and then immerse it in a reservoir of liquid crystal under vacuum and allow the cells to fill by capillary action, and then seal using, for example, ultra-violet light or thermo-curable adhesives. Next, the first set of independent cells 331 can be filled, again using a vacuum-filling method. The edge view 311 shows how the first set of independent cells 331 are initially open, to allow filling, while the cell wall structure 330 blocks the second and third sets of independent cells 332, 333. In one embodiment, the first set of independent cells 331 are then sealed using, for example, an epoxy. The epoxy should seal the first set of independent cells 331 to a depth below the line 340, such that when the substrate 300 is trimmed along line 340 to expose the fluid fill ports for the third set of independent cells 333, as illustrated in edge view 313, sufficient sealant remains to retain the liquid crystal materially previously-introduced into the first set of independent cells 331. Alternatively, the first set of independent cells 331 may be left unsealed after filling; the substrate 300 is then trimmed along the line 340 and immersed into a reservoir of liquid crystal material that the third set of independent cells 333 are to be filled with. The liquid crystal material previously introduced into the first set of independent cells 331 will substantially exclude the introduction of any of the liquid crystal material that is used to fill the third set of independent cells 333; even if a small quantity of the liquid crystal material used to fill the third set of independent cells 333 is introduced into the liquid crystal material used to fill the first set of independent cells 331, the effect on the characteristics of the liquid crystal material in the first set of independent cells 331 should be negligible. A sealant is then applied to the edge of the substrate 300 to simultaneously seal the fluid fill ports for the first and third sets of independent cells 331, 333.

In one embodiment, the first, second, and third liquid crystal materials introduced into the sets of independent cells 331, 332 and 333, respectively, have first, second, and third intrinsic, or extrinsic, wavelengths, respectively, and a pixel 350 (one shown) is comprised of adjacent portions, or "sub-pixels," of three independent cells, whereby the resulting liquid crystal display is capable of displaying a full-color image. For example, the first, second, and third intrinsic wavelengths may correspond to the colors red, green, and blue; those skilled in the art are familiar with the capability of displaying full-color images by combining sub-pixels of red, green, and blue to provide a pixel capable of displaying substantially the full range of visible colors - the range of colors being a function of the color and relative intensities of each sub-pixel. As described hereinabove, the location of each sub-pixel can be defined by the location of transparent electrodes (not shown) located on each substrate.

Turning now to FIG. 4, illustrated are a frontal view 400 and edge views 411, 412, 413 of a second exemplary substrate 400 having a cell wall structure that defines three sets of independent cells. As shown in the frontal view 410, the substrate 400 has a substantially planar base 420 having a cell wall structure 430 distributed on the surface of the base 420. The cell wall structure 430 defines first, second, and third sets of independent cells, generally designated 431, 432, and 433. The fluid fill ports for each set of independent cells 431, 432, 433 are located along the same edge of the substrate 400 when bonded to an opposing substrate 421, as shown in edge views 411, 412, and 413, respectively. Portions of the cell wall structure 430 are initially used to block the fluid fill ports for the second and third sets of independent cells 432 and 433, as shown in edge views 411 and 412; the purpose of blocking the fluid fill ports will be described hereinafter.

As with the other embodiments described herein, the cell wall structure 430 extends above the surface of the base 430 to a height equal to a preferred cell gap when mated to the second substrate 421, as shown in edge views 411, 412, and 413; the spacing between adjacent cell walls is a function of a desired size of a picture element, or "pixel."

As shown in the edge views 411, 412 and 413, when the substrate 400 is mated to a second substrate 421, the cell wall structure 430 defines three sets of independent cells 431, 432, and 433. In one embodiment, the set of independent cells 431 can be filled with a first liquid crystal material using a conventional vacuum-filling method. Subsequent to filling the first set of independent cells 431, the edge of the substrate 400 can be trimmed along a line 440, between the portions of the cell wall structure 430 generally designated as 441 and 442, in order to open the second set of independent cells 432 for filling with a liquid crystal material. The portion 442 of the cell wall structure 430 is preferably used to prevent the liquid crystal material used to fill the second set of independent cells 432 from entering the third set of independent cells 433. Subsequent to filling the second set of independent cells 432, the edge of the substrate 400 is trimmed along a line 444, below the portion of the cell wall structure 430 generally designated as 442, in order to open the third set of independent cells 433 for filling with a liquid crystal material.

In one embodiment, the first set of independent cells 431 are filled and then sealed using, for example, an epoxy, before the substrate 400 is trimmed along the line 440 to open the second set of independent cells 432 for filling; the epoxy should seal the first set of independent cells 431 to a depth below the line 444, such that when the substrate 400 is trimmed along line 444 to expose the fluid fill ports for the third set of independent cells 433, sufficient sealant remains to retain the liquid crystal materially previously-introduced into the first set of independent cells 431. Similarly, the second set of independent cells 432 are filled and then sealed using, for example, an epoxy, before the substrate 400 is trimmed along the line 444 to open the third set of independent cells 433 for filling; the epoxy should seal the second set of independent cells 432 to a depth below the line 444, such that when the substrate 400 is trimmed along line 444, sufficient sealant remains to retain the liquid crystal materially previously-introduced into the second set of independent cells 432.

As an alternative to sealing each set of independent cells subsequent to filling, the first set of independent cells 431 may be left unsealed; the substrate 400 is then trimmed along the line 440 and immersed into a reservoir of liquid crystal material that the second set of independent cells 432 is to be filled with. The liquid crystal material previously introduced into the first set of independent cells 431 will substantially exclude the introduction of any of the liquid crystal material that is used to fill the second set of independent cells 432; even if a small quantity of the liquid crystal material used to fill the second set of independent cells 432 is introduced into the liquid crystal material used to fill the first set of independent cells 431, the effect on the characteristics of the liquid crystal material in the first set of independent cells 431 should be negligible. Similarly, after filling the second set of independent cells 432, the substrate 400 is trimmed along the line 444 and immersed into a reservoir of liquid crystal material that the third set of independent cells 433 is to be filled with. The liquid crystal material previously introduced into the first and second sets of independent cells 431, 432 will substantially exclude the introduction of any of the liquid crystal material that is used to fill the third set of independent cells 433; even if a small quantity of the liquid crystal material used to fill the third set of independent cells 433 is introduced into the liquid crystal material used to fill the first and second sets of independent cells 431, 432, the effect on the characteristics of the liquid crystal material in the first and second sets of independent cells should be negligible. A sealant is then applied to the edge of the substrate 400 to simultaneously seal the fluid fill ports for the first, second, and third sets of independent cells 431, 432, 433.

In one embodiment, the first, second, and third liquid crystal materials introduced into the sets of independent cells 431, 432 and 433, respectively, have first, second, and third intrinsic wavelengths, respectively, and a pixel 450 (one shown) is comprised of adjacent portions, or "sub-pixels," of three independent cells, whereby the resulting liquid crystal display is capable of displaying a full-color image, as described with reference to FIG. 3. As also described hereinabove, the location of each sub-pixel can be defined by the location of transparent electrodes (not shown) located on each substrate.

Turning now to FIG. 5, illustrated are a frontal view 510 and edge views 511, 512, 513 of a third exemplary substrate 500 having a cell wall structure that defines first, second, and third sets of independent cells 531, 532, and 533. Physically, the "second set of independent cells" 532 is a single continuous cell that is interleaved between the first and third sets of independent cells 531, 533; in a final display, however, the matrix of electrodes used to selectively-control portions of the display will allow each linear section of the independent cell 532 to function independently of other linear sections of that cell—thus, for ease of description, the independent cell 532 will also be referred to as a set of independent cells.

As shown in the frontal view 510, the substrate 500 has a substantially planar base 520 having a cell wall structure 530 distributed on the surface of the base 520. The cell wall structure 530 defines the first, second, and third sets of independent cells 531, 532, and 533. The fluid fill ports for the first and third sets of independent cells 531, 533 are located at opposite edges of the substrate 500 when bonded to an opposing substrate 521, as shown in edge views 511 and 513, respectively. As shown in the edge view 512, a single fluid fill port is provided for the second set of independent cells 532.

As with the other embodiments described herein, the cell wall structure 530 extends above the surface of the base 520 to a height equal to a preferred cell gap when mated to the second substrate 521, as shown in edge views 511, 512, and 513, and the spacing between adjacent cell walls is a function of a desired size of a picture element, or "pixel."

In one embodiment, the first set of independent cells 531 can be filled with a first liquid crystal material using a conventional vacuum-filling method and then sealed using, for example, an epoxy. The second set of independent cells 532 can then be filled with a second liquid crystal material, again using a conventional vacuum-filling method, and then sealed. Likewise, the third set of independent cells 533 can then be filled with a third liquid crystal material, again using a conventional vacuum-filling method, and then sealed. Alternatively, if the substrates 520 and 521 are flexible, the first and third sets of independent cells 531 and 533 may be filled simultaneously by placing the bonded substrates in a vacuum, flexing the substrates such that the fluid fill ports on either edge are immersed in separate reservoirs of different liquid crystal materials, and then removing the vacuum to simultaneously draw liquid crystal material by capillary action into the first and third sets of independent cells 531, 533.

In one embodiment, the first, second, and third liquid crystal materials introduced into the sets of independent cells 531, 532 and 533, respectively, have first, second, and third intrinsic wavelengths, respectively, and a pixel 550 (one shown) is comprised of adjacent portions, or "sub-pixels," of three independent cells, whereby the resulting liquid crystal display is capable of displaying a full-color image. For example, as described with reference to FIG. 3, the first, second, and third intrinsic wavelengths may correspond to the colors red, green, and blue. As described hereinabove, the location of each sub-pixel can be defined by the location of transparent electrodes (not shown) located on each substrate.

Figure 6:
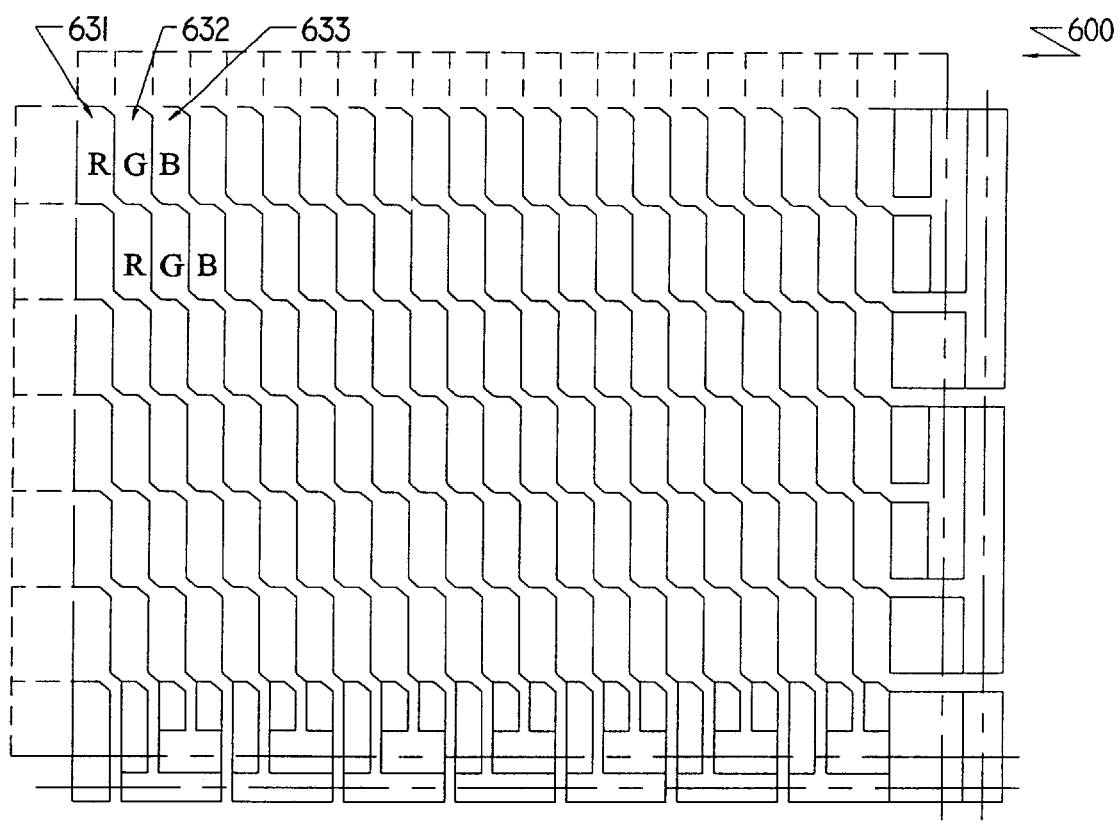
FIG. 6 illustrates a frontal view of a fourth exemplary substrate having a cell wall structure that: defines three sets of independent cells, according to the principles of the present invention.

Turning now to FIG. 6, illustrated is a frontal view of a fourth exemplary substrate 600 having a cell wall structure that defines first, second, and third sets of independent cells 631, 632, and 633. As with the other embodiments described herein, the cell wall structure extends above the surface of the base to a height equal to a preferred cell gap when mated to a second substrate, and the spacing between adjacent cell walls is a function of a desired size of a picture element, or "pixel." The exemplary substrate 600 is an example of the complex form that the independent cells may take, while still allowing for the filling of cells with different liquid crystal materials. The staggered arrangement of the independent cells 631, 632, 633 allows for the individual sub-pixels of a display to be offset, such that the color quality has better spatial color mixing; the offset design is similar to that of conventional color filters. As noted previously, the principles of the present invention are not limited to a specific physical layout of the independent cells; those skilled in the art will readily conceive of other advantageous independent cell structures for specific applications, all such structures intended to be within the scope of the claims recited hereinafter.

Figure 7:
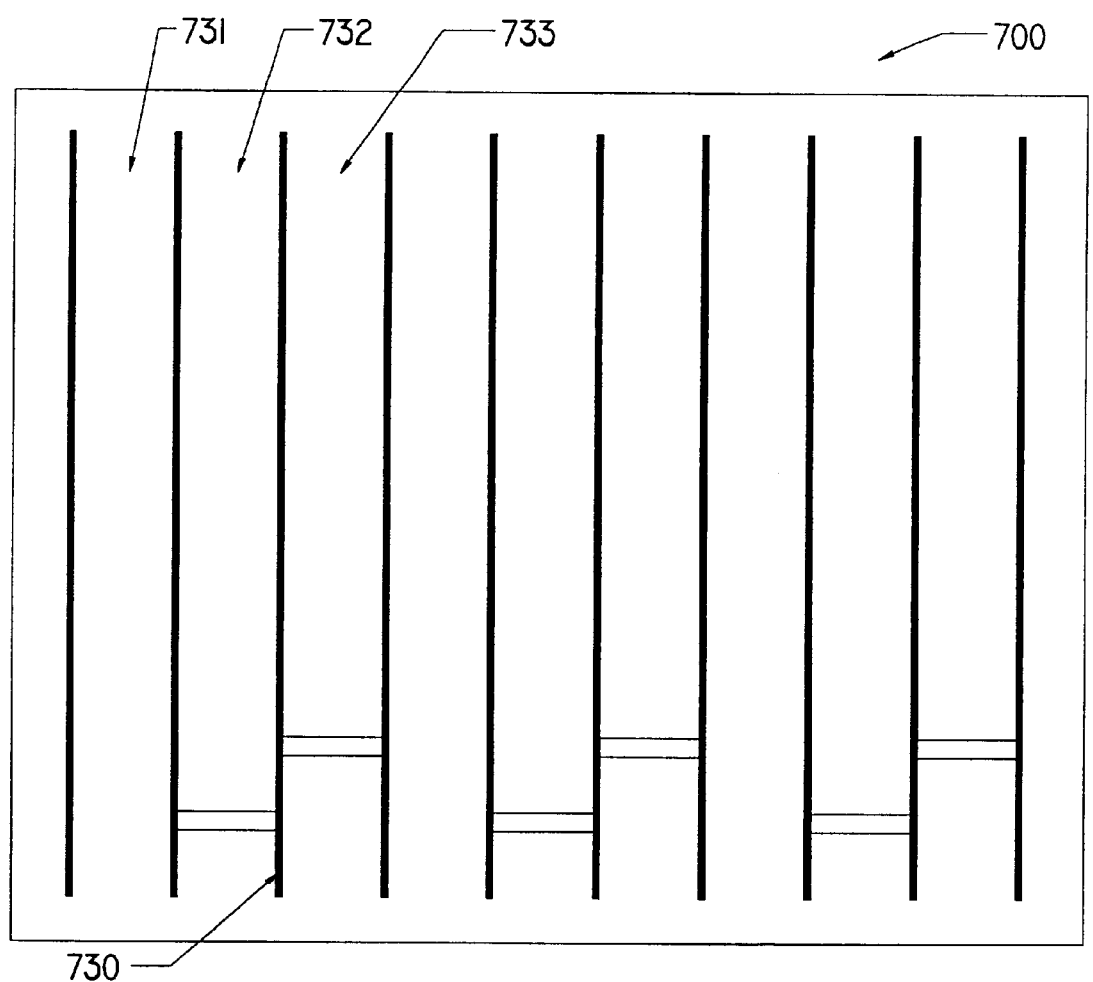
FIG. 7 illustrates a substrate having a cell wall structure that allows for the filling of independent cells by simple capillary action.

Turning now to FIG. 7, illustrated is a substrate 700 having a cell wall structure 730 that allows for the filling of independent cells by simple capillary action. The cell wall structure 730 defines first, second, and third sets of independent cells 731, 732, and 733. As with the other embodiments described herein, the cell wall structure 730 extends above the surface of the base to a height equal to a preferred cell gap when mated to a second substrate, and the spacing between adjacent cell walls is a function of a desired size of a picture element, or "pixel" The cell wall structure 730 is based on the recognition that if the end of each independent cell end is open to the atmosphere, the cells can be filled with a liquid crystal material by the capillary effect, with or without using a vacuum condition, which will simplify the filling process. Under a normal environment, or nitrogen purged chamber, and higher temperature the liquid crystal materials can be filled at relatively high speeds, which facilitates a sequential multi-color filling process. The open cell end sections may be treated with a surfactant to impart a low surface energy so that the liquid crystal materials will stop at the treated edge. The filling process can also be carried out in a vacuum environment in order to degas completely, which is an effective method for some high-viscosity materials. Use of a capillary filling method is not limited to the specific cell wall structure illustrated in FIG. 7; those skilled in the art will readily conceive of other cell wall structures that may be filled with liquid crystal materials by capillary action, all such structures intended to be within the scope of the claims recited hereinafter.

In addition to providing for the independent filling of individual cells, the substrates and sequential filling methods disclosed herein can be employed to integrate different display modes, or combinations, into a single display panel. For example, an STN-TN combination wherein the STN portion provides a graphic display matrix and the TN portion provides a segment-type display capable of displaying, for example, a clock or simple icons. Such combination displays can provide for a more vivid and functional display than conventional single mode displays. Another example is the combination of an analog display, e.g., temperature, and a digital display.

For some applications, independent cells may also be filled with a material other than a liquid crystal. For example, a segment type display may be designed wherein only the display segments are formed from one or more sets of independent cells that are filled with a desired liquid crystal, while the remainder of the display is an independent cell that is filled with a material other than a liquid crystal. Because liquid crystal materials are expensive, reducing the amount used in a display can significantly reduce the cost of the display. Moreover, the display portions which do not require a liquid crystal may be filled, for example, with a UV light-curable monomer material. The monomer material can be cured to form a rigid, or semi-rigid, polymer which adds strength and durability to the finished display. The optical quality of the display may also be improved in this way because the monomer material can be matched to the color of the display segments when in the optical "off" state, thus improving the contrast ratio of the display.

Theoretically, the principles of the present invention can be used to construct a liquid crystal display having any display mode combination and any combination of different liquid materials. Different types of displays can also be integrated on a single substrate. For example, a liquid crystal display (LCD) and an organic electro-luminescent display (ELD) can be provided on the same display panel; during the day, or in bright light, the LCD may be used, and at night, or in dark light, the ELD can be used. The use of cell wall structures, such as those disclosed herein, will also improve the stability of display structures because the individual cells are less easily deformed, thus stabilizing the liquid crystal textures which can be altered due to physical stress.

From the above, it is apparent that the present invention introduces the capability to independently fill sets of independent cells with different liquid crystal, or other, materials. Thus, a liquid crystal display capable of displaying two or more colors may be fabricated without the need for post-filling processing to selectively alter the color characteristic of the liquid crystal material in each cell subsequent to filling, or the use of a separate color filter.

Although the present invention and its advantages have been described in detail, those skilled in the art should understand that they can make various changes, substitutions and alterations herein without departing from the spirit and scope of the invention in its broadest form.

What is claimed is:

1. A substrate for a reflective cholesteric liquid crystal display (CLCD), comprising:

a substantially planar base; and a cell wall structure, located on a surface of said base, that defines at least first and second sets of independent cells having corresponding fluid fill ports when said cell wall structure is bonded to an opposing substrate and wherein said independent cells are sufficiently narrow as to allow a reflective cholesteric liquid crystal material to be filled by surface tension without vacuum.

2. The substrate as recited in claim 1 wherein fluid fill ports corresponding to said first set of independent cells are on an opposite end of said substrate from fluid fill ports corresponding to said second set of independent cells.

3. The substrate as recited in claim 1 wherein said first set of independent cells are adapted to be filled separate from the filling of said second set of independent cells.

4. The substrate as recited in claim 1 wherein said first and second sets of independent cells are parallel.

5. The substrate as recited in claim 1 wherein said independent cells form columns of said LCD.

6. The substrate as recited in claim 1 further comprising said opposing substrate mated to said cell wall structure, said fluid fill ports adapted to receive a seal to selectively trap liquid crystal (LC) fill fluids within said independent cells.

7. The substrate as recited in claim 6 further comprising first and second liquid crystal (LC) fill fluids having first and second intrinsic wavelengths, respectively, located in said first and second sets of independent cells, respectively, to form a multi-color LCD.

8. The substrate as recited in claim 1 wherein said cell wall structure consists of a single serpentine wall.

9. The substrate as recited in claim 1 wherein said independent cells are sufficiently narrow to be filled by means of capillary action.

10. A method of manufacturing a substrate for a reflective colored cholesteric liquid crystal display (CLCD), comprising the steps of:

forming a substantially planar base; and forming a cell wall structure on a surface of said base, said cell wall structure defining at lease first and second sets of independent cells having corresponding independent fluid fill ports when said cell wall structure is bonded to an opposing substrate and wherein said independent cells are sufficiently narrow as to allow a reflective cholesteric liquid crystal material to be filled by surface tension without vacuum.

11. The method as recited in claim 10 wherein fluid fill ports corresponding to said first set of independent cells are on an opposite end of said substrate from fluid fill ports corresponding to said second set of independent cells.

12. The method as recited in claim 10 wherein said first set of independent cells are adapted to be filled separate from the filling of said second set of independent cells.

13. The method as recited in claim 10 wherein said first and second sets of independent cells are parallel.

14. The method as recited in claim 10 wherein said independent cells form columns of said LCD.

15. The method as recited in claim 10 further comprising the step of mating said opposing substrate to said cell wall structure, said fluid fill ports adapted to receive a seal to selectively trap a liquid crystal (LC) fill fluid within said independent cells.

16. The method as recited in claim 10 further comprising the step of introducing first and second liquid crystal (LC) fill fluids having first and second intrinsic wavelengths, respectively, into said first and second sets of independent cells, respectively, to form a multi-color LCD.

17. The method as recited in claim 10 wherein said step of forming said cell wall structure comprises the step of forming a single serpentine wall.

18. The method as recited in claim 10 further comprising the step of filling said independent cells by means of capillary action.

19. A reflective multi-color cholesteric liquid crystal display (CLCD), comprising:

a first substrate;

a cell wall structure, located on a surface of said first substrate, that defines a plurality of recesses on said first substrate;

a second substrate, joined to said cell wall structure, whereby said recesses form at least first and second sets of independent cells bounded by said cell wall structure and said first and independent fluid fill ports and wherein said independent cells are sufficiently narrow as to allow a reflective cholesteric liquid crystal (CLC) material to be filled by surface tension without vacuum;

a first CLC fill fluid located in said first set of independent cells; and a second CLC fill fluid located in said second set of independent cells, said first CLC fill fluid having a different intrinsic wavelength from said second CLC fill fluid.

20. The LCD as recited in claim 19 wherein said independent fluid fill ports corresponding to said first set of independent cells are on an opposite end of said LCD from fluid fill ports corresponding to said second set of independent cells.

21. The LCD as recited in claim 19 wherein said independent cells form columns of said LCD.

22. The LCD as recited in claim 19 wherein said cell wall structure consists of a single serpentine wall.

23. The LCD as recited in claim 19 wherein said independent cells are sufficiently narrow to be filled by means of capillary action.

24. A method of manufacturing a reflective colored cholesteric liquid crystal display (CLCD), comprising the steps of:

forming a first substrate having a cell wall structure located thereon that defines a plurality of recesses on said first substrate;

joining a second substrate to said cell wall structure, whereby said recesses form at least first and second sets of independent cells bounded by said cell wall structure and said first and second substrates, said first and second sets of independent cells having corresponding independent fluid fill ports and wherein said independent cells are sufficiently narrow as to allow a reflective cholesteric liquid crystal (CLC) material to be filled by surface tension without vacuum;

introducing a first CLC fill fluid into said first set of independent cells;

introducing a second CLC fill fluid into said second set of independent cells, said first CLC fill fluid having a different intrinsic wavelength from said second CLC fill fluid; and sealing said fluid fill ports whereby said first and second CLC fill fluids are retained in said first and second sets of independent cells.

25. The method as recited in claim 24 wherein said independent fluid fill ports corresponding to said first set of independent cells are on an opposite end of said LCD from fluid fill ports corresponding to said second set of independent cells.

26. The method as recited in claim 24 wherein said independent cells form columns of said LCD.

27. The method as recited in claim 24 wherein said cell wall structure consists of a single serpentine wall.

28. The method as recited in claim 24 wherein said steps of introducing said first and second LC fill fluids each comprise the step of filling said independent cells by means of capillary action.

* * * * *